June 8, 1926.
I. D. WALTER
1,587,929
FELLY AND RIM FOR WHEELS
Filed Jan. 17, 1924    3 Sheets-Sheet 1
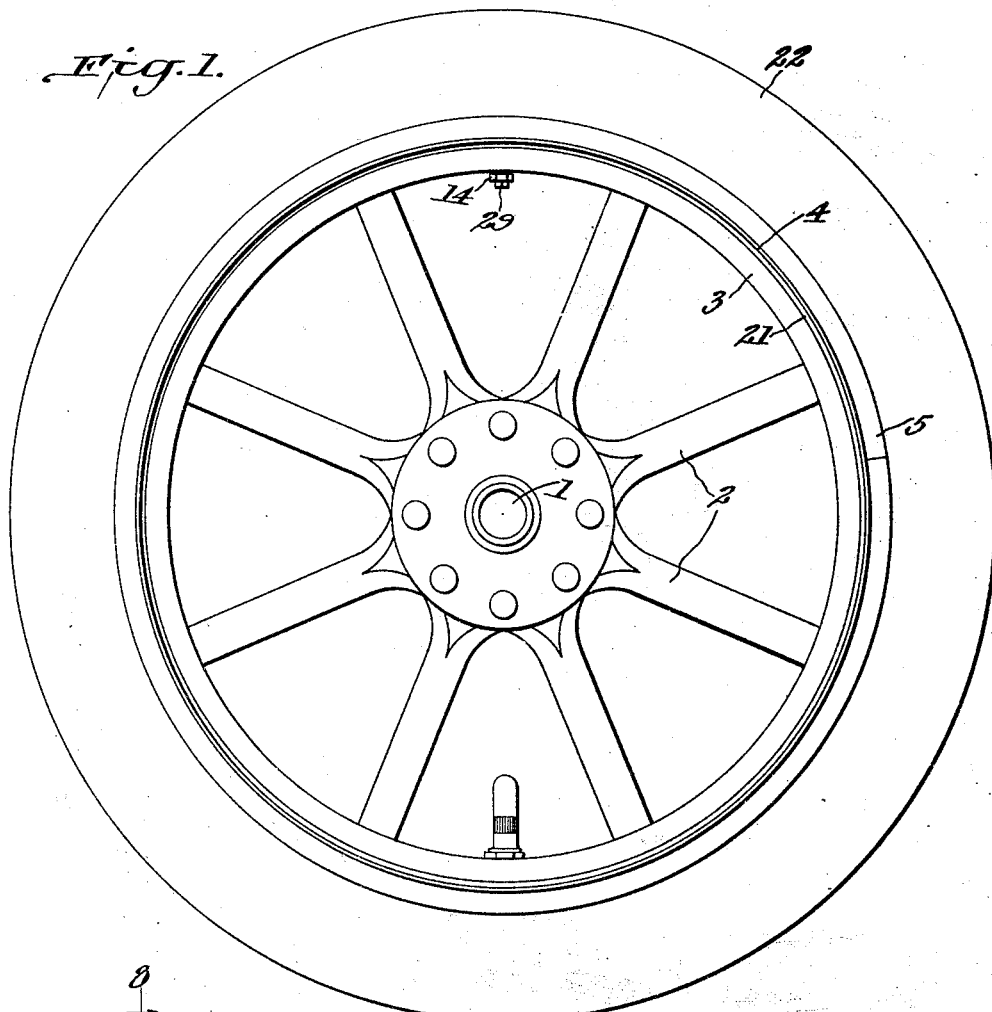
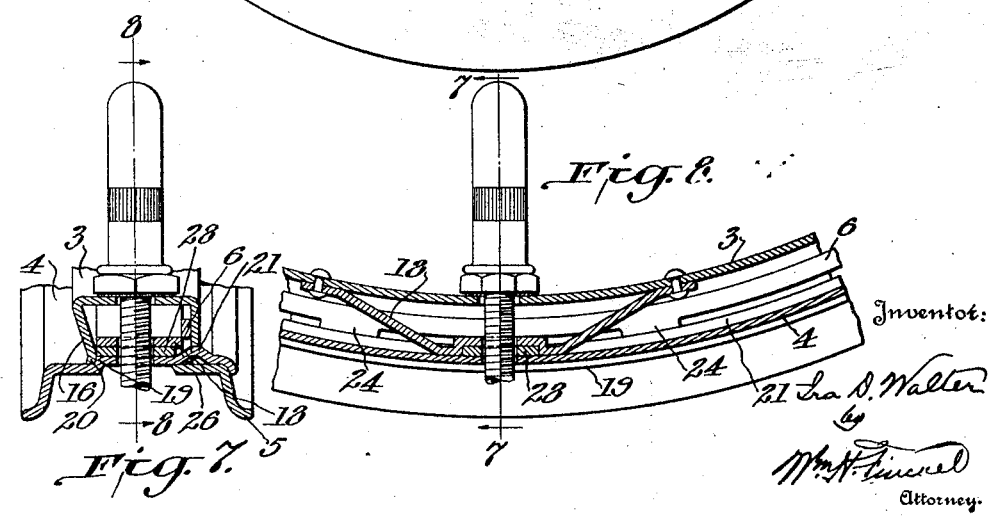

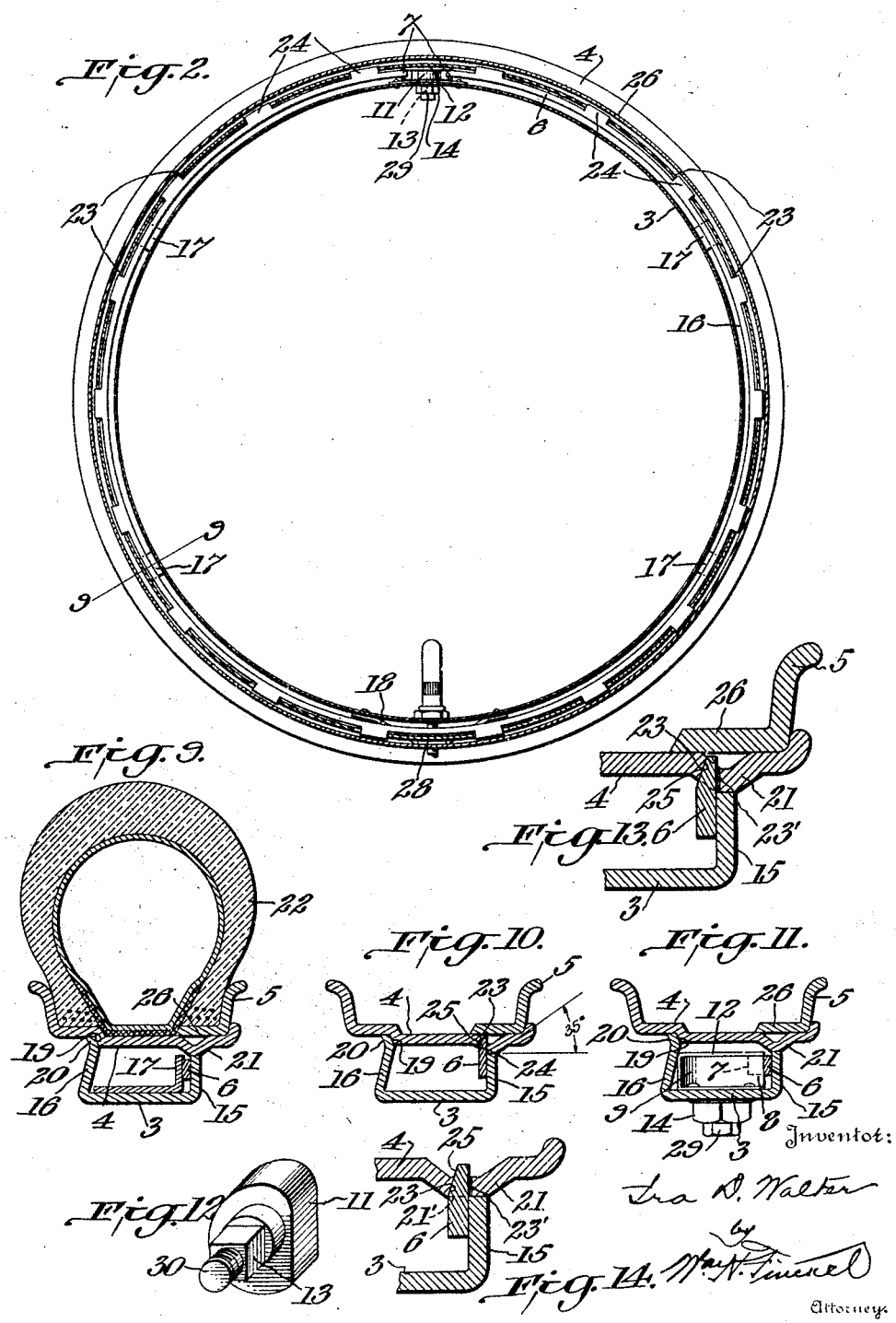

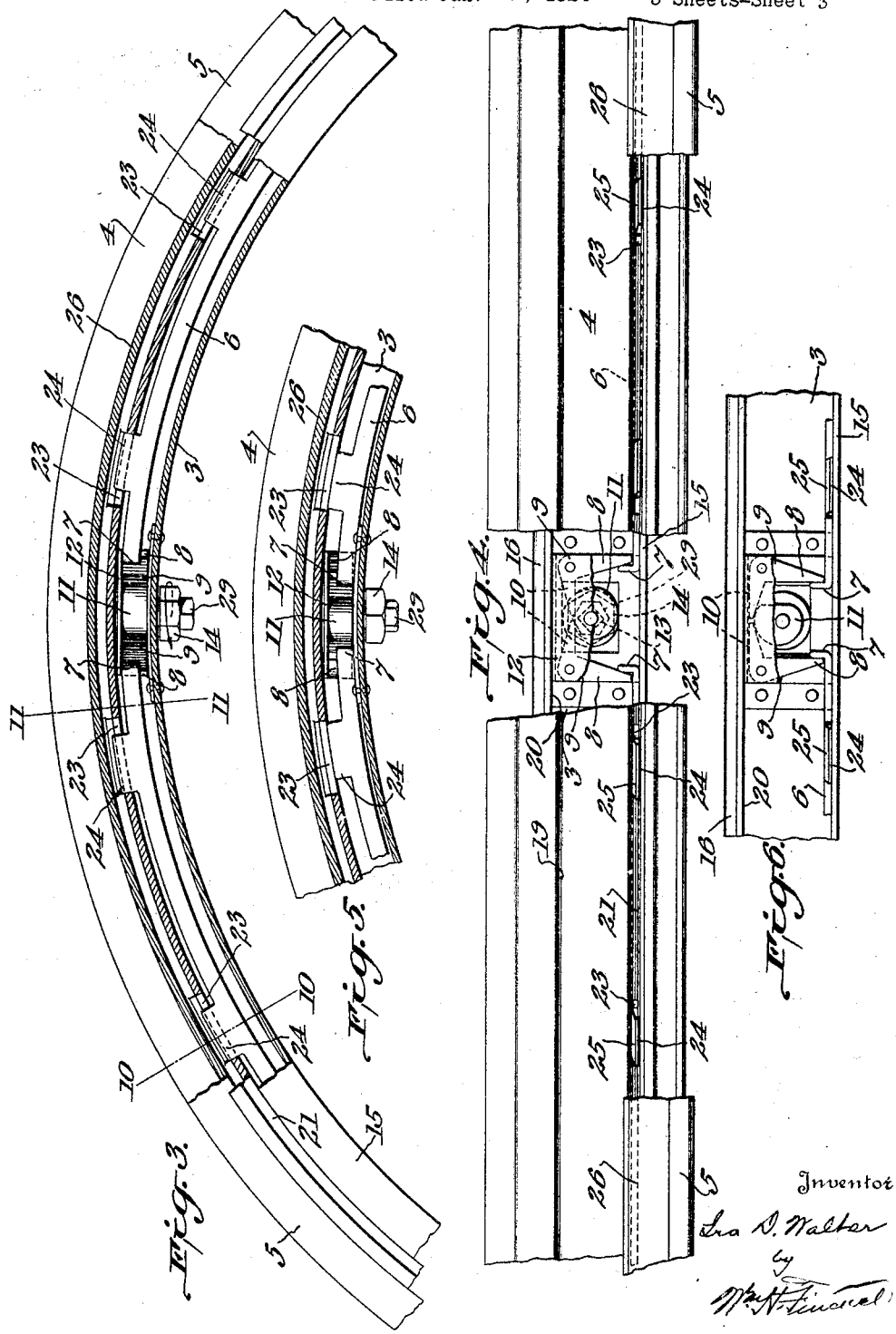

Patented June 8, 1926.

1,587,929

UNITED STATES PATENT OFFICE.

IRA D. WALTER, OF HARRISBURG, ARKANSAS, ASSIGNOR OF ONE-FOURTH TO JOSIAH BRINKERHOFF AND ONE-FOURTH TO CHARLES R. FRENCH, BOTH OF HARRISBURG, ARKANSAS.

FELLY AND RIM FOR WHEELS.

Application filed January 17, 1924. Serial No. 686,751.

I have discovered that it is commercially practicable to produce a truly circular wheel felly of sheet metal, and a truly circular sheet metal rim for cooperation with such a felly, for use in mounting pneumatic and other tires, but particularly pneumatic tires, upon the wheels of automobiles and other road vehicles.

This practical commercial production of a truly circular metal felly and rim makes it possible to provide such a fit between the felly and rim as to obviate the necessity for the use of lugs or clamps, as is the common practice, when the rim is made demountable from the felly, and by thus obviating the necessity for the use of such lugs or clamps distortion of the rim, which is a common occurrence when they are used, is eliminated, and, the true circularity of the rim being maintained, longer life and uniform wearing of the tire result.

The object of my invention is to provide a demountable rim, preferably of the type known in the trade as a detachable or separable demountable rim, primarily for use in connection with a metal felly wheel, and to provide means for positioning and locking such a rim upon the felly without the use of the ordinary lugs or clamps, and in such a manner that the rim is capable of being quickly and easily mounted upon and demounted from the felly and the time-consuming and exasperating adjusting of the ordinary lugs or clamps done away with.

The invention consists in a felly for vehicle wheels, and a demountable rim for cooperation with this felly, means being carried by and concealed within the felly and cooperating with the rim, for detachably securing the rim to the felly without the use of attaching lugs or clamps and bolts, whereby a felly and rim of neat and attractive appearance and enhanced utility are provided, as I will proceed now to explain and finally claim.

In the accompanying drawings illustrating the invention, in the several figures of which like parts are similarly designated, Figure 1 is a side elevation of a wheel embodying my invention. Fig. 2 is a section of the felly and rim, illustrating the means for detachably securing the rim upon the felly. Fig. 3 is a fragmentary sectional elevation similar to Fig. 2, but on a larger scale and illustrating the parts more in detail. Fig. 4 is a fragmentary plan view looking down upon Fig. 3 a portion of the rim being broken away to show the cam and lever mechanism. Fig. 5 is a view similar to Fig. 3 but showing the rim securing means disengaged from the rim. Fig. 6 is a fragmentary view of a portion of the felly showing the parts carried thereby in the position shown in Fig. 5. Fig. 7 is a fragmentary section taken through the valve stem of the tire and associated parts in the plane of line 7—7, Fig. 8, but showing the valve stem in elevation. Fig. 8 is a fragmentary sectional elevation taken on the line 8—8, Fig. 7. Fig. 9 is a section taken on the line 9—9 of Fig. 2, but on a larger scale and showing conventionally one form of pneumatic tire in position. Fig. 10 is a section taken on the line 10—10 of Fig. 3. Fig. 11 is a section taken on the line 11—11 of Fig. 3. Fig. 12 is a perspective view of the cam for actuating the rim securing means. Fig. 13 is a greatly enlarged fragmentary section showing the parts shown in Fig. 10. Fig. 14 illustrates a modification of the rib of the rim.

Referring particularly to Fig. 1, I show a wheel of any approved construction as to the hub 1 and spokes 2, and upon the spokes 2 I mount a metal felly 3 of truly circular channel form, for cooperation with a rim 4 of the separable demountable type, substantially as shown in my copending applications filed respectively Sept. 27, 1922, Serial No. 590,923 and June 8, 1923, Serial No. 644,187, and having the split retaining ring 5.

Referring now particularly to Figs. 2, 3, 4, 5 and 6, the felly 3 is provided with a spring locking ring 6, mounted to float within the channel of the felly, and having its ends inturned as at 7, Figs. 4 and 6, to engage the arms 8 of levers 9, the other arms 10 of which are engaged by a cam 11. These levers and the cam have pivot bearings in a box-like housing 12 secured to the web of the felly 3 and the cam 11 is provided with a squared extension 13 upon which is mounted an operating member 14, preferably, in exterior conformation, of hexagonal nut shape to which a wrench may be applied for the purpose of turning the cam to oscillate the levers upon their pivots so as to contract the ring 6, or to permit this ring to expand.

As will be seen particularly by reference to Figs. 9, 10, 11 and 13, the felly is formed with an outer straight side 15 and an inner inclined side 16, and the locking ring 6 contacts throughout its circumference with the inner surface of the straight outer side 15 of the felly, and is held in sliding engagement therewith by a plurality of guides 17 secured to the web of the felly, and by a positioning member 18, later described (see Figs. 2, 7, 8 and 9).

Again referring to Figs. 9, 10, 11 and 13, it will be seen that I form the rim 4 in such a manner as to provide a stop shoulder 19 adapted to engage with a stop 20 formed on the felly, and I also provide the rim with a depressed rib 21 adapted to seat upon the outer periphery of the side 15 of the felly. This construction of rim, combined with the particular formation of felly shown, effects a positioning of the tire 22 over the vertical central plane of the hub and spokes of the wheel and affords double line circumferential support between the felly and rim, which is an advantage well recognized in the trade.

The rib 21 is provided at intervals throughout its circumference with slots 23 and these slots are adapted to receive lugs or keys 24 formed upon the locking ring. In the drawings I have shown eighteen of these lugs or keys 24 and their complemental slots 23, but it will be understood that more or fewer of same may be used as may be found expedient. As will be seen by reference particularly to Figs. 4, 6, 10 and 13, the lugs or keys 24 have their inner faces bevelled as at 25 and the slots have complemental bevelled faces, so that when the ring 6 expands and the keys 24 enter the slots 23 in the rim, there will be a tendency to force the rim inwardly upon the felly so that the stop shoulder 19 will intimately engage the stop 20, and the rib 21 will be positioned directly in alignment over the side 15 of the felly. It will be noted that the slots 23 are wider than the keys 24, as indicated at 23' Fig. 13, so that in case of wear between the contacting parts of the rim and felly the keys 24 may, by their axial wedge action, compensate therefor.

The detachable split ring 5 of the rim has a foot 26 which, when the ring is in tire-retaining position, completely straddles and covers the depression in the rim caused by the rib 21, thereby providing a support for the wall of tire 22 on a level with the opposite raised portion of rim and also avoiding contact of the tire wall with the ring keys or lugs 24 extending through the rib 21.

It is customary to provide a positioning lug upon demountable rims to prevent creeping of the rim upon the felly, so that the valve stem of the inner tube will not be sheared off. I provide such a lug 28 (Figs. 7 and 8), and for cooperation therewith attach to the felly the positioning member 18 which forms a guide for the ring 6 as above stated and in addition prevents creeping of the rim upon the felly, and positions the rim with respect to the felly so that the holes for the valve stem will aline and the slots 23 in the rim and lugs or keys 24 on the ring 6 will come in proper relative position.

It will be noted that the slots 23 are of greater circumferential length than the lugs or keys 24. This is necessary in order that, under the influence of the action of the cam 11, the ring 6 may be contracted and its keys 24 withdrawn from the slots 23.

The operation of my rim is substantially as follows:—Assuming that a tire has been mounted upon the rim, and it is desired to mount the rim upon the felly, the cam 11 is turned, by means of the member 14, to the position shown in Figs. 5 and 6, and the ring 6 consequently contracted and its lugs 24 moved in so that their outer edges are substantially in line with the outer periphery of the side 15 of the felly. With the parts in this position, the rim with the tire thereon, is so manipulated that the valve stem may pass through the openings provided therefor in the felly, as is customary, and then the portion of the rim opposite to that through which the valve stem passes is pushed inward upon the felly until the stop shoulder 19 is in contact with the stop 20 of the felly. The rim and felly being truly circular, they will when in this position assume an intimate contact throughout their circumferences, whereby a continuous bearing between the rim and felly is assured. Now, by simply turning the cam 11 to the position shown in Figs. 3 and 4, the locking ring 6 will be permitted to expand under its own spring action, and the lugs or keys 24 will enter the slots 23 in the rib 21, and, as has been previously described, their bevelled faces 25 will cause the stop shoulder 19 of the rim to be forced with a substantially uniform pressure throughout its circumference against the stop 20 of the felly, and lateral movement of the rim with respect to the felly in either direction will be prevented. Creeping of the rim upon the felly will of course be prevented by the cooperation of the parts 18 and 28.

As will be seen, the member 14 is securely attached to the squared portion 13 by a locking nut 29 carried by a threaded extension 30 of the squared portion 13.

In Fig. 14 I have shown a modification of the rib 21 whereby when the locking ring 6 is permitted to expand the keys 24 will engage with the slots 23 more quickly than is possible where the type of rib shown in the other figures of the drawings is used. This object is accomplished by forming the rib with a broader bearing surface as indicated at 21', thus bringing the edges of the slots 23 into closer proximity to the leading ends of the keys 24. This construction also provides facility for greater lateral displacement of the rim to compensate for wear between the rim and felly, should such wear occur.

Obviously, the rib 21 may be made of any surface conformation so long as its useful function is retained, but I have found that the form of this rib best suited for the purposes of this invention and which provides a maximum of ease in forcing the rim upon the felly is one in which the slanting sides of the rib are arranged at an angle to the rim face of about 35°.

It will be noted that in the arrangement shown and described, no bevelling or slanting of either the inner surface of the rim or the outer surfaces of the felly as is the common practice in commercial demountable rims is required. This level form of contact certainly appreciably reduces, and probably eliminates the constant tendency to wear loose and produce rim squeak as is present in the ordinary commercial rims where the load is supported entirely upon bearing surfaces that are bevelled or slanting and are held in this position by fastening elements that are not self-compensating for the wear that must ultimately set up in these parts. In my rim the load-carrying and bearing shoulders are limited to such narrow width of contact that there will be little or no likelihood of rust occasioning any difficulty in demounting the rim from the felly.

Furthermore, as will be seen by reference to Fig. 1, all of the mechanical devices embodied in the securing means, except the member 14 and nut 29, are concealed and enclosed within the felly, and the result is a wheel of neat and attractive appearance free from projections which would collect mud and would rust and become unsightly. Although I have shown my invention in a rim and felly applied to a spoked or artillery-type wheel, it will be obvious that it may be applied to other types of wheels, and is to be so understood.

It is to be understood also that I do not consider my invention as limited to the particular embodiment herein shown and described, as it is obvious that various changes may be made therein without departing from the spirit of the invention or the scope of the following claims.

What I claim is:—

1. A felly of channel form comprising a web and sides, a rim for cooperation with said felly, one of the sides of said felly providing a support for said rim and the other side providing a support and a stop for said rim, a locking ring mounted and enclosed within said felly and in contact with the first mentioned side thereof and provided with lugs, means defining slots in said rim for cooperation with said lugs to retain said rim on said felly, and means for withdrawing said lugs from said slots to permit removal of said rim from said felly.

2. A felly, a rim, a securing member carried by said felly, slots formed in said rim, lugs carried by said securing member and adapted to engage with said slots, whereby said rim is secured upon said felly, and means carried by said felly and cooperating with said securing means whereby said lugs may be disengaged from said slots to permit demounting of said rim from said felly.

3. A felly, a rim for cooperation therewith, a contractible spring ring mounted within said felly and provided with a plurality of lugs arranged in spaced relation around its periphery, said rim having a plurality of slots formed therein in spaced relation around its circumference complemental to said lugs, said lugs adapted to engage with said slots under the spring influence of said ring, means for contracting said ring to disengage said lugs from said slots, and cooperating means on said felly and rim for relatively positioning said rim so that when the rim is mounted upon the felly said slots will be positioned in cooperative relation with respect to said lugs.

4. A felly of channel cross section comprising a web and sides, one of said sides provided with a stop, a locking ring arranged in sliding engagement with the inner face of the other of said sides and provided with lugs having bevelled faces, and a rim provided with a stop shoulder for engagement with said stop and with slots for engagement with said lugs, whereby when said lugs engage with said slots the bevelled faces of the lugs will force said stop shoulder into intimate engagement with said stop.

5. A felly, provided with a lugged locking ring, a rim for engagement with said felly and having a rib provided with means for engagement with the lugs of said ring and through which said lugs project, said rim being provided with a tire retaining ring detachable from said rim and having a foot overlying the rib of the rim for preventing contact of the tire with said lugs, as specified.

6. A felly, a rim for cooperation therewith, a divided spring locking ring carried by said felly for cooperation with said rim, and means for effecting contraction of said ring including a pair of levers having arms engaging the ends of said ring at said split and arms engaged by a cam, and means for imparting rotation to said cam for effecting contraction of said ring by oscillation of said levers.

7. A felly, a rim for cooperation therewith, a split locking ring carried by said felly and cooperating with said rim, the ends of said ring at said split being inturned, and means for effecting contraction and permitting expansion of said ring including a cam a pair of levers having arms cooperating with the inturned ends of said ring and arms cooperating with said cam, whereby upon rotation of said cam said ring may be contracted or permitted to expand under the influence of said levers.

In testimony whereof I have hereunto set my hand this 16th day of January, A. D. 1924.

IRA D. WALTER.